Feb. 5, 1924.
W. J. TIDEMAN
1,482,955
ADJUSTABLE CASTER
Filed Dec. 10, 1921
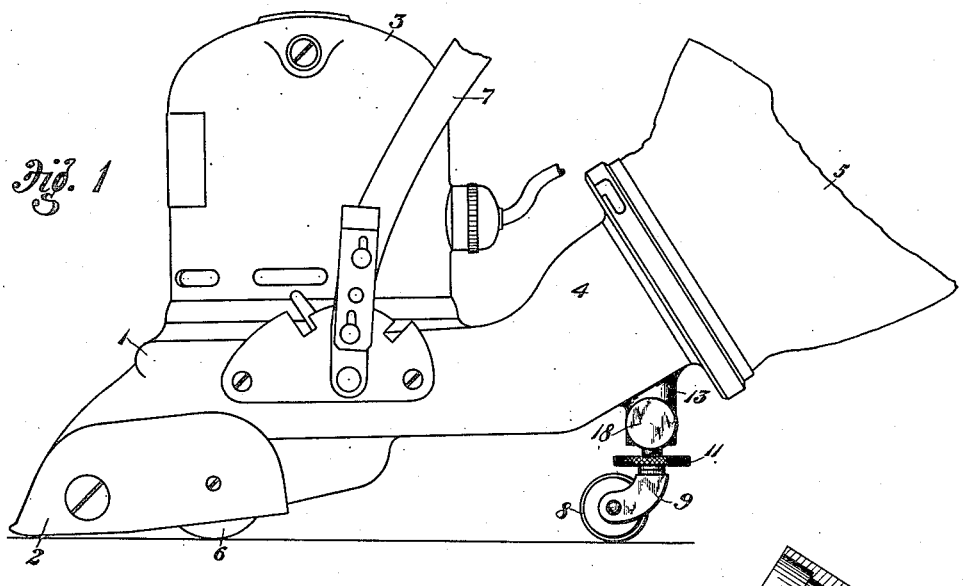
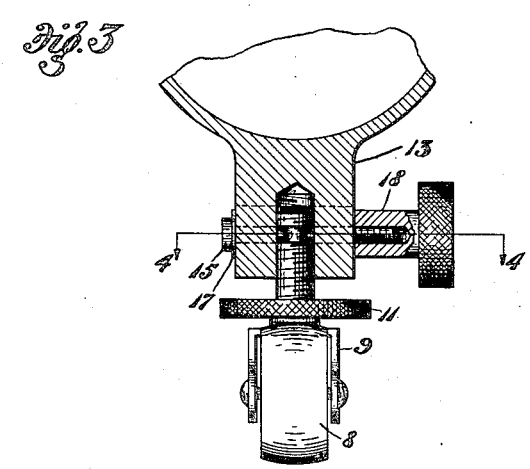
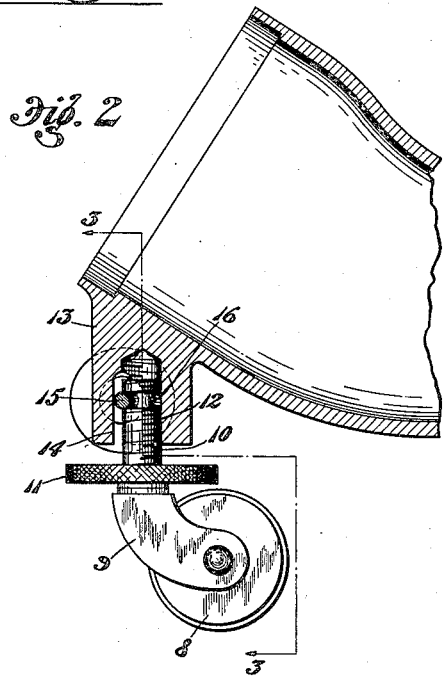
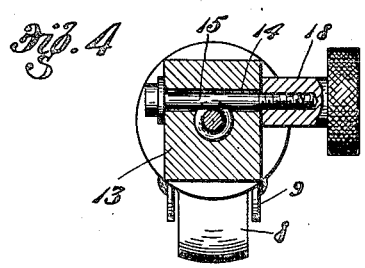
Inventor
William J. Tideman
By Frease and Bond
Attorney Patented Feb. 5, 1924.

1,482,955

UNITED STATES PATENT OFFICE.

WILLIAM J. TIDEMAN, OF CANTON, OHIO, ASSIGNOR TO THE UNITED ELECTRIC COMPANY, OF CANTON, OHIO, A CORPORATION.

ADJUSTABLE CASTER.

Application filed December 10, 1921. Serial No. 521,342.

*To all whom it may concern:*

Be it known that I, WILLIAM J. TIDEMAN, a citizen of the United States, residing at Canton, in the county of Stark and State of Ohio, have invented a new and useful Improvement in Adjustable Casters, of which the following is a specification.

This invention relates to a caster for the rear end of a portable vacuum cleaner or similar use, wherein it is desirable to adjust the caster vertically with reference to the machine, to tilt the same upward or downward upon its forward wheels, and wherein the vibration of the machine tends to change the adjustment; and the objects of the improvement are to provide simple means for adjusting such a caster to a plurality of positions and for stopping or holding it in the various positions.

The above and other objects may be attained by providing an adjusting screw upon the bracket carrying the caster and mounting the same in a threaded socket provided in the cleaner, an annular groove being provided in the adjusting screw and engaged by a locking screw for locking the adjusting screw in any desired position.

An embodiment of the invention thus set forth in general terms is illustrated in the accompanying drawing, in which—

Figure 1 is a side elevation of a portable vacuum cleaner showing the improved caster thereon;

Fig. 2, a vertical, longitudinal, sectional view through the rear portion of the machine showing the caster attached thereto;

Fig. 3, a section on the line 3—3, Fig. 2; and

Fig. 4, a section on the line 4—4, Fig. 3.

Similar numerals of reference indicate corresponding parts throughout the drawing.

The suction cleaner illustrated includes the fan casing 1 provided upon its forward side with the suction nozzle 2, on top with the motor casing 3 and in the rear with the discharge outlet 4 leading to the dust collector bag 5, the nozzle portion of the machine being usually supported upon the wheels 6; and on each side of the casing is pivoted a handle bail 7 by means of which the machine is manipulated.

The machine being supported at its forward end upon the wheels 6, the same can be tilted upward or downward by lowering or raising the rear end thereof; and for the purpose of limiting the downward movement, a rear casting 8 is usually provided. By making this rear caster adjustable vertically, with reference to the rear end of the machine, the normal position of the nozzle with reference to the floor or carpet, can be varied.

For the purpose of the present invention, the rear caster 8 is preferably journaled within the bifurcated bracket 9 which is preferably swiveled upon the lower end of the adjusting screw 10, said adjusting screw being preferably provided with the enlarged knurled head 11 by means of which the screw may be adjusted vertically within the internally threaded socket 12 formed in the depending boss 13 formed upon the rear portion of the casing.

The boss 13 is provided with a longitudinal slot 14 communicating with the threaded socket or bore 12 upon one side thereof, the locking screw 15 being located through said slot and engaging the annular groove 16 formed in the upper end portion of the adjusting screw 10, a washer 17 being preferably located around the locking screw at the head end thereof for engagement with the adjacent side of the boss 13, a locking nut 18 being provided upon the threaded extremity of the locking screw and arranged to engage the adjacent side of the boss.

In adjusting the caster to raise or lower the rear end of the sweeper, the locking nut 18 is loosened, and the adjusting screw is turned, by means of the knurled head 11 thereon to the desired adjustment, the locking screw being moved vertically through the slot 14 by the engagement of the groove 16 in the adjusting screw therewith. When the desired adjustment is reached, the locking nut is again tightened until the washer 17 and locking nut frictionally engage opposite sides of the boss 13, preventing rotation of the adjusting screw by vibration of the machine, thereby holding the caster in the desired position of adjustment.

By this construction and arrangement, it is evident that the caster bracket with the rear caster thereon may be adjusted to and from the bottom of the vacuum cleaner by merely loosening the locking nut and turning the adjusting screw in either direction, and that when a particular adjustment is given to the caster, the locking nut may be tightened, normally holding the adjusting screw against rotation by the engagement of the locking screw with the annular groove in the adjusting screw.

I claim:—

1. A caster for vacuum cleaners or the like including an adjusting screw having an annular groove, a caster carried thereby, and a locking screw extending tangentially through the groove in the adjusting screw and vertically movable with the adjusting screw.

2. A caster for vacuum cleaners or the like including a vertical adjusting screw, a caster carried thereby and a transversely disposed locking screw movable vertically with the adjusting screw.

3. A caster for a vacuum cleaner or the like having a threaded socket and a slot communicating with one side thereof, an adjusting screw located in the socket and provided with a groove, a caster carried by the adjusting screw and a locking screw located through the slot and engaging the groove in the adjusting screw.

WILLIAM J. TIDEMAN.